(12) United States Patent
Kadowaki

(10) Patent No.: US 9,851,552 B2
(45) Date of Patent: Dec. 26, 2017

(54) IMAGE DISPLAY APPARATUS

(71) Applicant: CANON KABUSHIKI KAISHA, Tokyo (JP)

(72) Inventor: Ryota Kadowaki, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/165,067

(22) Filed: May 26, 2016

(65) Prior Publication Data
US 2016/0353066 A1 Dec. 1, 2016

(30) Foreign Application Priority Data
Jun. 1, 2015 (JP) .................. 2015-111154

(51) Int. Cl.
*G02B 26/00* (2006.01)
*H04N 9/31* (2006.01)
*G03B 21/20* (2006.01)

(52) U.S. Cl.
CPC ......... *G02B 26/008* (2013.01); *G03B 21/204* (2013.01); *H04N 9/3114* (2013.01); *H04N 9/3158* (2013.01); *G09G 2320/0247* (2013.01)

(58) Field of Classification Search
CPC .. G03B 21/204; G03B 21/205; G03B 21/208; G03B 21/2013; G03B 21/2033; H04N 9/3114; H04N 9/3117; H04N 9/3155; H04N 9/3158; H04N 9/3164; G09G 5/02; G09G 5/18

See application file for complete search history.

(56) References Cited

U.S. PATENT DOCUMENTS

| | | | |
|---|---|---|---|
| 2012/0188516 A1 | 7/2012 | Kashiwagi et al. | |
| 2013/0107230 A1* | 5/2013 | Murai .................. | G03B 21/204 353/85 |
| 2013/0114049 A1* | 5/2013 | Li ...................... | G03B 21/2013 353/84 |
| 2013/0229631 A1 | 9/2013 | Toyooka et al. | |
| 2015/0029234 A1* | 1/2015 | Ishizu .................. | G09G 5/18 345/690 |
| 2015/0124431 A1* | 5/2015 | Motoya ................ | G02B 26/008 362/84 |
| 2016/0170199 A1* | 6/2016 | Inoue .................. | G03B 21/14 348/761 |

FOREIGN PATENT DOCUMENTS

| | | |
|---|---|---|
| JP | 2012103398 A | 5/2012 |
| JP | 2012155059 A | 8/2012 |

* cited by examiner

*Primary Examiner* — Sultan Chowdhury
(74) *Attorney, Agent, or Firm* — Rossi, Kimms & McDowell LLP

(57) ABSTRACT

Provided is the image display apparatus including: the light source which emits excitation light; a phosphor which converts the excitation light into fluorescent light and rotates; an image display element which modulates the fluorescent light; and a control unit which controls the image display element so that the image display element repeats first displaying based on an image signal and second displaying which is darker than the first displaying, at a predetermined frequency, wherein when a higher frequency of the predetermined frequency and a rotation frequency of the phosphor is represented by Fhigh, and a lower frequency thereof is represented by |Fhigh/2−Flow|<15.

11 Claims, 4 Drawing Sheets

FIG. 4

LASER FLICKER FREQUENCY    60 Hz

| PHOSPHOR WHEEL ROTATION FREQUENCY | DEGREE OF FLICKER |
|---|---|
| 40 Hz | LARGE |
| 60 Hz | NONE |
| 90 Hz | LARGE |
| 110 Hz | SOMEWHAT LARGE |
| 120 Hz | NONE |
| 125 Hz | SMALL |
| 130 Hz | SOMEWHAT SMALL |
| 150 Hz | SOMEWHAT LARGE |
| 160 Hz | SMALL |
| 180 Hz | NONE |
| 200 Hz | SMALL |
| 210 Hz | SMALL |
| 240 Hz | NONE |

FIG. 5

LASER FLICKER FREQUENCY    240 Hz

| PHOSPHOR WHEEL ROTATION FREQUENCY | DEGREE OF FLICKER |
|---|---|
| 40 Hz | SMALL |
| 60 Hz | NONE |
| 90 Hz | SOMEWHAT LARGE |
| 110 Hz | SOMEWHAT SMALL |
| 120 Hz | NONE |
| 125 Hz | SMALL |
| 130 Hz | SOMEWHAT SMALL |
| 150 Hz | SOMEWHAT LARGE |
| 160 Hz | SMALL |
| 175 Hz | SMALL |
| 180 Hz | SOMEWHAT SMALL |
| 200 Hz | LARGE |
| 210 Hz | LARGE |
| 240 Hz | NONE |

FIG. 6

LASER FLICKER FREQUENCY    120 Hz

| PHOSPHOR WHEEL ROTATION FREQUENCY | DEGREE OF FLICKER |
|---|---|
| 40 Hz | SOMEWHAT LARGE |
| 60 Hz | NONE |
| 90 Hz | SOMEWHAT LARGE |
| 100 Hz | LARGE |
| 120 Hz | NONE |
| 140 Hz | LARGE |
| 150 Hz | SOMEWHAT LARGE |
| 180 Hz | SMALL |
| 200 Hz | SMALL |
| 220 Hz | SOMEWHAT LARGE |
| 230 Hz | SOMEWHAT SMALL |
| 240 Hz | NONE |
| 250 Hz | SOMEWHAT SMALL |
| 260 Hz | LARGE |

FIG. 7

LASER FLICKER FREQUENCY    96 Hz

| PHOSPHOR WHEEL ROTATION FREQUENCY | DEGREE OF FLICKER |
|---|---|
| 40 Hz | SOMEWHAT LARGE |
| 60 Hz | LARGE |
| 96 Hz | NONE |
| 100 Hz | LARGE |
| 120 Hz | LARGE |
| 150 Hz | SOMEWHAT LARGE |
| 170 Hz | SOMEWHAT LARGE |
| 182 Hz | SMALL |
| 192 Hz | NONE |
| 202 Hz | SMALL |
| 210 Hz | SOMEWHAT LARGE |
| 220 Hz | SOMEWHAT LARGE |
| 240 Hz | SMALL |
| 260 Hz | SMALL |

…

IMAGE DISPLAY APPARATUS

BACKGROUND OF THE INVENTION

Field of the Invention

The present invention relates to an image display apparatus which uses fluorescent light emitted from an excited phosphor, and in particular, to the one suitable for an image projection apparatus (liquid crystal projector or the like) which illuminates an image display element such as a liquid crystal panel provided on an illuminated surface, and projects light emitted from the image display element onto a projected surface such as a screen.

Description of the Related Art

In recent years, various projectors are proposed which have each such a structure as to expand a light flux which has been modulated so as to correspond to image information, by using an image display element such as a liquid crystal display element, and project the expanded light flux onto a screen or the like, through a projection optical system (projection lens system).

As for a light source device (light-emitting device) which is used for a projector that uses a liquid crystal display element, conventionally, a device has been used which takes in a light flux that is emitted from a mercury lamp or the like in all directions, through a paraboloid reflector. Not only such a device, but also a light source (hereinafter referred to as solid light source) is starting to be used which uses a semiconductor such as a light-emitting diode (LED) and a laser, and emits a short-wavelength light (excitation light).

In addition, there is also a method of irradiating a phosphor with light emitted from the solid light source, and utilizes light (fluorescent light) of which the wavelength has been converted. Furthermore, because the intensity of light emitted from the solid light source increases due to the increase of light output, and the phosphor generates heat, a method of reducing the heat generation by rotating a disc-like wheel (hereinafter referred to as phosphor wheel) is known onto which the phosphor has been applied. Here, light conversion efficiency varies due to the unevenness of the thickness of the phosphor that has been applied onto the phosphor wheel, and/or the nonuniformity of the irradiated positions, which originates in nonuniform rotation, and fluctuates in a rotation cycle. However, the light conversion efficiency is averaged if the rotation frequency is sufficiently increased, and accordingly when the rotation frequency exceeds 60 Hz, for instance, the fluctuation is not almost perceived.

However, when the irradiation intensity of the solid light source is changed with time, a beat frequency component is generated which has a lower frequency than the rotation frequency, by the synthesis of the rotation cycle of the phosphor wheel and the cycle of the intensity change of the solid light source. This beat frequency component occasionally degrades a quality of a displayed image as a flicker which degrades a display quality, though depending on the intensity.

United States Patent Application publication No. 2013/0229631 discloses a technique of reducing the occurrence of the flicker by matching the flicker frequency of the solid light source with the rotation frequency of the phosphor wheel or limiting the flicker frequency to the multiples of the rotation frequency, in order that the beat frequency component becomes not less than 20 Hz or does not occur.

Incidentally, Japanese Patent Application Laid-Open No. 2012-155059 discloses a pseudo-impulse driving of which the displayed image is made to resemble an impulse type display, by performing intermittent lighting for interrupting lighting, only in a particular period in one frame period, as black insertion for enhancing an image display performance.

SUMMARY OF THE INVENTION

An image display apparatus according to the present invention includes: a light source which emits excitation light; a phosphor which converts the excitation light into fluorescent light and rotates; an image display element which modulates the fluorescent light; and a control unit which controls the image display element so that the image display element repeats first displaying based on an image signal and second displaying which is darker than the first display, at a predetermined frequency, wherein when a higher frequency of the predetermined frequency and a rotation frequency of the phosphor is represented by Fhigh, and a lower frequency thereof is represented by Flow, the frequencies satisfy a relationship of;

$$|Fhigh/2-Flow|<15.$$

Further features of the present invention will become apparent from the following description of exemplary embodiments with reference to the attached drawings.

BRIEF DESCRIPTION OF THE DRAWINGS

FIG. 4 is a view for describing a relationship between the number of rotation of a phosphor wheel and flicker, according to Exemplary Embodiment 1.

FIG. 5 is a view for describing a relationship between the number of rotation of a phosphor wheel and flicker, according to Exemplary Embodiment 2.

FIG. 6 is a view for describing a relationship between the number of rotation of a phosphor wheel and flicker, according to Exemplary Embodiment 3.

FIG. 7 is a view for describing a relationship between the number of rotation of a phosphor wheel and flicker, according to Exemplary Embodiment 4.

DESCRIPTION OF THE EMBODIMENTS

Preferred embodiments of the present invention will now be described in detail in accordance with the accompanying drawings.

<<First Embodiment>>

(Image Display Apparatus)

Figure 1:
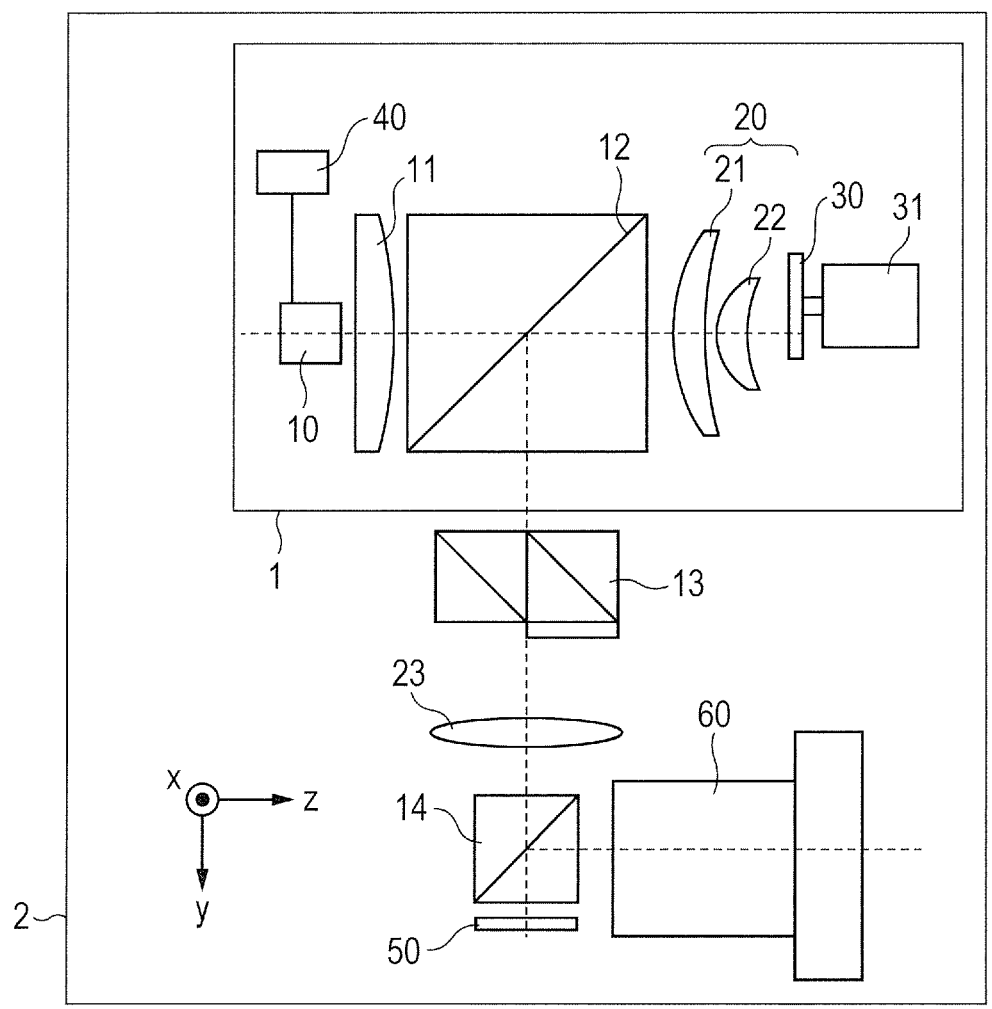
FIG. 1 is a schematic block diagram of an image display apparatus according to an embodiment of the present invention.

FIG. 1 illustrates a schematic configuration of an image projection apparatus which works as an image display apparatus according to the embodiment of the present invention. In FIG. 1, light which has passed through a light-emitting device (light source device) 1 becomes light in which p-polarized light and s-polarized light coexist. The light is unified into the p-polarized light by passing through a polarized light conversion element 13, and is guided to a condensing lens 23. The light which has been condensed by the condensing lens 23 passes through a polarization beam splitter 14, and is introduced to an image display element 50.

Then, the light is modulated in the image display element 50, is reflected by the polarization beam splitter 14, is guided to a projection lens 60, is expanded there, and is projected onto an screen surface or the like (not shown).

(Light-Emitting Device (Light Source Device)

The light-emitting device (light source device) 1 which uses a phosphor according to the present embodiment will be described below with reference to FIG. 1. In FIG. 1, a laser light source 10, a collimating lens 11, a dichroic polarization beam splitter 12, condensing lenses 21 and 22, a condensing lens system 20 which is formed of the condensing lenses 21 and 22, and a phosphor wheel 30 which acts as a rotating fluorescent plate are shown. In addition, a motor 31 and a control unit 40 of a laser light source are shown. The above-mentioned phosphor wheel 30 has a ring shape with a center axis (typically, a rotation axis of the motor 31). The above-mentioned motor 31 causes the phosphor wheel 30 with the ring shape to rotate about the above-mentioned center axis (the rotation axis of the motor 31). Instead of the ring shape, the phosphor wheel 30 (a region on which a phosphor is applied) may be configured to has a rectangular shape, a line segment shape with a thickness or a circular shape. Further, instead of the rotation of the phosphor wheel 30, a phosphor may be configured to move back and forth along a line or to move randomly.

A light flux emitted from the laser light source is converted into a parallel light flux in the collimating lens 11. The dichroic polarization beam splitter 12 has such characteristics as to select whether to transmit or reflect light having a wavelength band of the laser light source 10 according to a polarization direction, and as to reflect light of the phosphor wheel 30.

Figure 2:
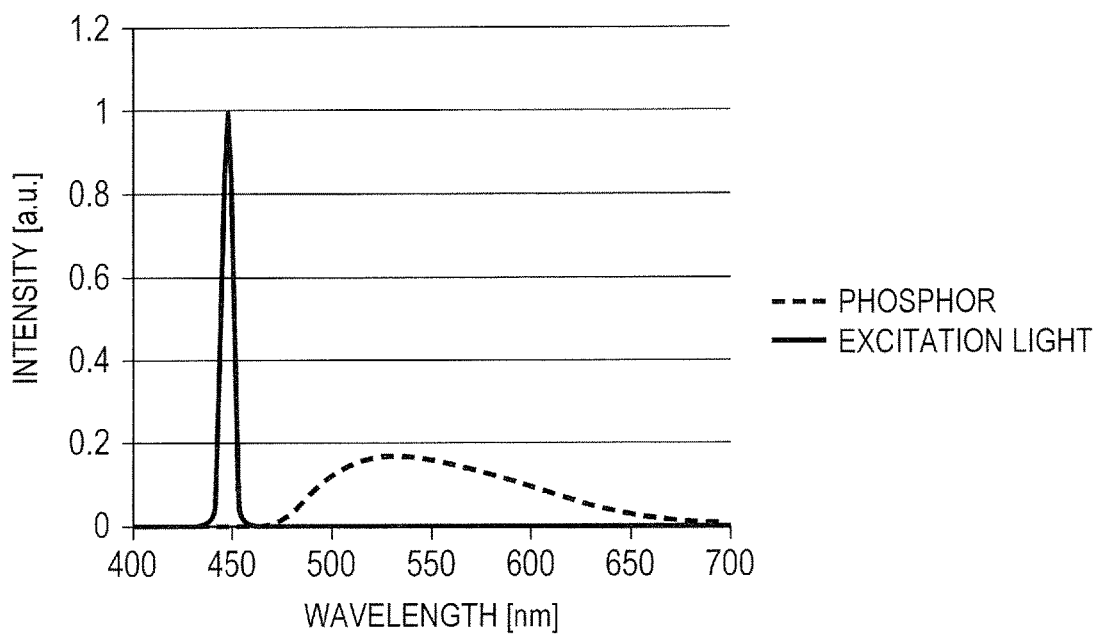
FIG. 2 is a view for describing one example of a distribution of wavelengths of excitation light and fluorescent light, according to the embodiment of the present invention.
Figure 3:
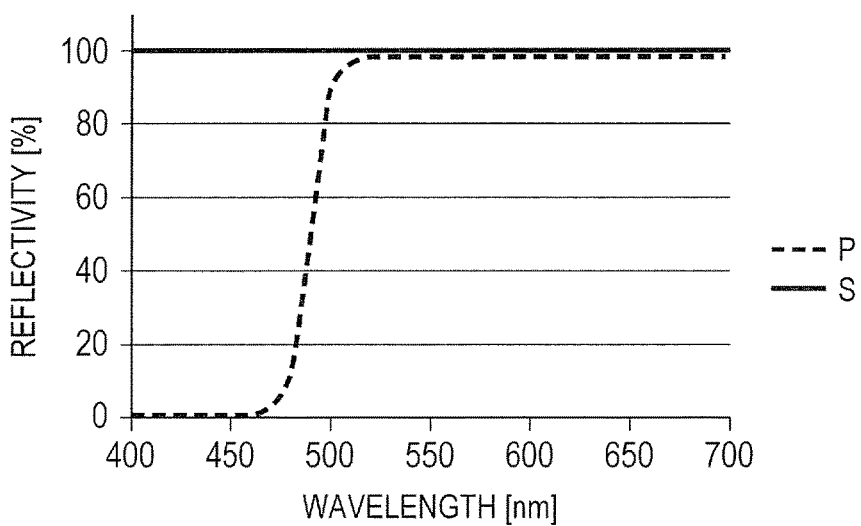
FIG. 3 is a view for describing characteristics of wavelengths of a dichroic polarization beam splitter according to the embodiment of the present invention.

FIG. 2 illustrates a light emission spectrum of the laser light source 10 and the phosphor which is applied on the phosphor wheel 30, according to the present embodiment. In addition, FIG. 3 illustrates characteristics of the dichroic polarization beam splitter 12.

In the present embodiment, the light emitted from the laser light source 10 is configured to be the p-polarized light, and the dichroic polarization beam splitter 12 is configured to have such characteristics as to transmit the p-polarized light therethrough in the wavelength band of the laser light source 10. Because of this, the light emitted from the laser light source 10 passes through the dichroic polarization beam splitter 12, and is condensed to the phosphor wheel 30 by a condensing lens system 20. Here, the intensity of the light which has been emitted from the laser light source and reflected on the phosphor wheel 30 is not constant in the period of the rotation cycle of the phosphor wheel 30.

Most of rays which have incident on the phosphor 30 are converted into rays having a different wavelength from those emitted from the laser light source 10, and emit fluorescent light. A part of rays of which the wavelength has not been converted, in the rays which have irradiated the phosphor wheel 30, is diffused/reflected. The rays which have been emitted from the laser light source 10 and have been diffused/reflected are in a randomly polarized state. The fluorescent light and the diffused/reflected light from the phosphor wheel 30 pass through the condensing lens system 20 again, and thereby become a parallel light flux.

The emitted fluorescent light is reflected by the dichroic polarization beam splitter 12. In the excitation light which has been diffused/reflected, a component which is polarized light perpendicularly to the light at the time of incidence is reflected by the dichroic polarization beam splitter 12. Thus, the light is emitted from the light-emitting device (light source device) 1 toward the image display element 50.

Incidentally, the number of lenses which constitute the condensing lens system 20 changes according to the setting of the efficiency at which the condensing lens system 20 condenses light to the phosphor wheel 30 and takes in light emitted from the phosphor 30. Because of this, the number of lenses may be one, and may also be three or more.

The phosphor wheel 30 is connected to the motor and is rotationally driven, in order to decrease a temperature rise which originates in a light flux emitted from the laser light source 10. The rotation frequency is approximately 3600 rpm to 14400 rpm, and the phosphor wheel 30 is required to be rotated at a higher speed from the viewpoint of cooling. Here, the phosphor wheel 30 is a wheel which is formed of a substrate material made from aluminum or the like and has a powder of the phosphor applied thereon together with an adhesive material that is called as a transparent binder. Because of the production process, the thickness is uneven within the circumference onto which the phosphor has been applied, and because light emission efficiency of fluorescent light varies depending on the thickness, the vibration of the light emission intensity occurs in the rotation cycle.

In addition, the efficiency at which the condensing lens system takes in light is sensitive to a distance between a final surface of the condensing lens 23 and the phosphor wheel 30, and accordingly also when the distance between the phosphor wheel 30 and the lens varies in the rotation cycle because of the component mounting accuracy, the vibration of the light emission intensity occurs according to the rotation cycle. However, the rotation frequency is 3600 rpm (60 Hz) or more, the intensity change originating in the mounting accuracy or the like is also several percent, and accordingly even though the light is visually observed, the above described vibration of the light emission intensity is averaged and cannot be recognized.

On the other hand, the light emitted from the laser light source 10 can be submitted to intensity modulation by the control unit 40. In a normal state, so-called CW (continuous wave) driving is performed which keeps the intensity of the laser light source 10 constant, and accordingly the vibration of the light emission intensity does not occur (still image display mode). However, when the control unit 40 modulates the intensity, the vibration of the light emission intensity (beat component) is generated (moving image display mode). In particular, when the lights-out period of the light source is extended so as to enhance the performance of the moving image, (at the time of so-called pseudo-impulse driving, or black insertion), the intensity of the beat component also becomes large. The time of black insertion will be described below.

(Insertion of Black Image (Black Insertion)

A black insertion (pseudo-impulse driving) is known as one of a method of enhancing the moving image resolution, for the image display element which performs a hold-type display, such as a liquid crystal display element. The image display element 50 in the present embodiment is also an image display element which performs the hold-type display.

The image display element switches the displayed image at driving frequency, but a black image is inserted or the incident light is interrupted so as to match the switching timing, and thereby the image is converted into a state in which a picture is not recognized. Thereby, blurring between two images can be suppressed.

(Relationship between Flicker Frequency A of Light Source and Rotation Frequency B of Rotating Fluorescent Plate)

In the present embodiment, when the flicker frequency of the light source is represented by A, and the rotation frequency of the rotating fluorescent plate is represented by B, the frequencies firstly satisfy the following expression (1), as a prerequisite that the moving image can be displayed.

$$|B-A| \geq 30 \qquad (1)$$

The frequencies can further satisfy a relationship of:

$$|B-A| \geq 60 \qquad (1a).$$

Here, when one of the flicker frequency A of the laser light source and the rotation frequency B of the phosphor wheel becomes an integral multiple of the other, the same portion of the phosphor wheel results in being continuously irradiated with light. As a result, the position to be irradiated with light is fixed, and accordingly a time period given for the thermal relaxation becomes short. In contrast to this, in the present invention, repetitive irradiation is avoided; and thereby the temperature rise is suppressed and the flicker can be improved. Specifically, in the present invention, the frequencies do not satisfy a relationship of $t \times A = u \times B$ (where t and u are natural numbers of 1 or more and 10 or less).

(Relationship between Rotation Frequency B of Rotating Fluorescent Plate and Driving Frequency C of Image Display Element)

Here, the driving frequency of the image display element means a frequency of the black insertion (pseudo-impulse driving) for artificially increasing the moving image resolution. In addition, the black insertion means an operation of repeating the first displaying based on the input image signal, and the second displaying (or black displaying) which is darker than the first displaying. Specifically, the black insertion is to insert the second displaying (though second displaying may be based on image signal or may not be based on image signal) which is darker than the first displaying, between the first displayings which are relatively bright image displaying, and thereby can enhance the visibility of the moving image.

Here, in the above described frequencies B and C, when a higher frequency of the frequencies B and C is represented by Fhigh, and a lower frequency thereof is represented by Flow, the frequencies desirably satisfy a relationship of:

$$|F\text{high}/2 - F\text{low}| < 15 \qquad (2).$$

Furthermore, the upper value can be set at 9 or 5, and then a further desirable effect can be obtained.

In addition, when the values of B and C are too close to each other, the beat component becomes large. Accordingly, the frequencies can satisfy a relationship of:

$$|F\text{high} - F\text{low}| \geq 30 \qquad (3),$$

and further can satisfy a relationship of:

$$|F\text{high} - F\text{low}| \geq 60 \qquad (3a).$$

(Relationship between Flicker Frequency A of Light Source and Driving Frequency C of Image Display Element)

Here, in the present embodiment, when the driving frequency of the image display element is represented by C, the frequencies satisfy the following expression (4).

$$0.95 \times m \times C \leq n \times A \leq 1.05 \times m \times C \text{(where n and m are natural numbers)} \qquad (4)$$

The frequencies can further satisfy a relationship of:

$$n \times A = m \times C \text{(where n and m are natural numbers)} \qquad (4a).$$

(Effect of Present Embodiment)

Thus, when enhancing the visibility of the moving image by using the phosphor which is excited by the solid light source, the image display apparatus suppresses a flicker of the light intensity originating in a synthesized wave of a flicker of the solid light source and the rotation cycle of the phosphor, also can be excellent in a cooling performance, and can enhance its long-term reliability.

(Specific Exemplary Embodiments)

When the black insertion is performed, the driving frequency of the image display element is approximately 60 Hz to 240 Hz (here, laser light source 10 may be turned off at driving frequency of image display element). Experimental results concerning the presence or absence of the flicker component in the cases where the driving frequency C of the image display element is set at different values will be described below.

(Exemplary Embodiment 1)

An experimental result in the case where the driving frequency C of the image display element of the light source is 60 Hz will be described below. In this case, a flicker component is produced at a low frequency based on a difference between the driving frequency of the image display element and the number of rotation of the phosphor wheel 30. FIG. 4 illustrates a low-frequency component which is produced due to the number of rotation of the phosphor wheel 30, and a degree of the flicker.

The laser light source 10 is flickered at 60 Hz, and accordingly the flicker itself exists even though there is no low-frequency component. In FIG. 4, "none" described in the column which is described as the degree of the flicker means that the degree does not deteriorate, and "small" means that the degree does not cause a problem though changing. "Somewhat large" and "large" mean that the change of the degree becomes a problem at thus declared frequencies.

When the number of rotation (rotation frequency) of the phosphor wheel 30 was changed, it was confirmed that the degree of the flicker was large, if a difference (beat frequency component) between the number of rotation and the driving frequency C of the image display element was less than 30 Hz. This difference between the number of rotation of the phosphor wheel and the driving frequency of the image display element desirably satisfies the previously described (3) or (3a). On the other hand, it was confirmed that the degree of the flicker became small, if the difference between the driving frequency C of the image display element and a divided half of the rotation frequency (in the case where rotation frequency of phosphor wheel was higher than driving frequency of image display element) of the phosphor wheel was less than 15 Hz.

(Exemplary Embodiment 2)

An experimental result in the case where the driving frequency C of the image display element is 240 Hz will be described below. FIG. 5 illustrates a low-frequency component which is produced due to the number of rotation (rotation frequency) of the phosphor wheel, at the time when the driving frequency C of the image display element is 240 Hz, and the degree of the flicker.

Also in the present exemplary embodiment, in regard to the rotation of the phosphor wheel 30, when the difference (beat frequency component) between the number of rotation and the driving frequency C of the image display element was less than 30 Hz, it was confirmed that the degree of the flicker was large. In addition, when the difference between a divided half of a higher value in the number B of rotation of the phosphor wheel and the driving frequency C of the image display element and the other value was set at less than 15 Hz, it was confirmed that the degree of the flicker became small.

(Exemplary Embodiment 3)

An experimental result in the case where the driving frequency C of the image display element is 120 Hz will be described below. FIG. 6 illustrates a low-frequency component which is produced due to the number of rotation (rotation frequency) of the phosphor wheel, at the time when the driving frequency C of the image display element is 120 Hz, and the degree of the flicker.

Also in the present embodiment, similar facts to those in Exemplary Embodiments 1 and 2 were confirmed.

(Exemplary Embodiment 4)

An experimental result in the case where the driving frequency C of the image display element is 96 Hz will be described below. FIG. 7 illustrates a low-frequency component which is produced due to the number of rotation (rotation frequency) of the phosphor wheel, at the time when the driving frequency C of the image display element is 96 Hz, and the degree of the flicker.

Also in the present exemplary embodiment, similar facts to those in the previously described Exemplary Embodiments 1 to 3 were confirmed.

MODIFIED EXAMPLES

In the above described embodiments, favorable embodiments of the present invention have been described, but the present invention is not limited to these embodiments, and can be modified in various ways in such a range as not to deviate from the scope.

Modified Example 1

In the above described embodiments, the reflection type of the image display element has been used, but the present invention is not limited to the reflection type, and a transmission type of an image display element can also be used. In addition, the image display element is not limited to the liquid crystal, and the present invention can be applied to an arbitrary image display element.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-111154, filed Jun. 1, 2015, which is hereby incorporated by reference herein in its entirety.

What is claimed is:

1. An image display apparatus comprising:
a light source which emits excitation light;
a phosphor which converts the excitation light into fluorescent light and rotates;
an image display element which modulates the fluorescent light; and
a control unit which controls the image display element so that the image display element repeats first displaying based on an image signal and second displaying which is darker than the first displaying, at a predetermined frequency, wherein
the control unit can be operated in a moving image display mode which repeats the first displaying and the second displaying, and in a still image display mode which does not repeat the first displaying and the second displaying, and
in a case of operating in the moving image display mode, when a higher frequency of the predetermined frequency and a rotation frequency of the phosphor is represented by Fhigh, and a lower frequency thereof is represented by Flow,
the frequencies satisfy a relationship of:

$|Fhigh/2-Flow|<15$.

2. The image display apparatus according to claim 1, wherein the frequencies satisfy a relationship of:

$|Fhigh/2-Flow|\geq 30$.

3. The image display apparatus according to claim 1, wherein
when a flicker frequency of the light source is represented by A and the predetermined frequency is represented by C, the frequencies satisfy $0.95 \times m \times C \leq n \times A \leq 1.05 \times m \times C$ (where n and m are natural numbers).

4. The image display apparatus according to claim 1, wherein the light source is a solid light source.

5. The image display apparatus according to claim 1, wherein
intensity of the fluorescent light which is emitted from the phosphor changes in a period of a rotation cycle of the phosphor.

6. The image display apparatus according to claim 1, further comprising:
a projection optical system which projects an image displayed on the image display element onto a screen surface.

7. An image display apparatus comprising:
a light source which emits excitation light;
a phosphor which converts the excitation light into fluorescent light and rotates;
an image display element which modulates the fluorescent light; and
a control unit which controls the image display element so that the image display element repeats first displaying based on an image signal and second displaying which is darker than the first displaying, at a predetermined frequency, wherein
when a higher frequency of the predetermined frequency and a rotation frequency of the phosphor is represented by Fhigh, and a lower frequency thereof is represented by Flow, a flicker frequency of the light source is represented by A and the predetermined frequency is represented by C,
the frequencies satisfy relationships of:

$|Fhigh/2-Flow|<15$, and $0.95 \times m \times C \leq n \times A \leq 1.05 \times m \times C$ (where n and m are natural numbers).

8. The image display apparatus according to claim 7, wherein the frequencies satisfy a relationship of:

$|Fhigh-Flow|\geq 30$.

9. The image display apparatus according to claim 7, wherein the light source is a solid light source.

10. The image display apparatus according to claim 7, wherein intensity of the fluorescent light which is emitted from the phosphor changes in a period of a rotation cycle of the phosphor.

11. The image display apparatus according to claim 7, further comprising:

a projection optical system which projects an image displayed on the image display element onto a screen surface.

\* \* \* \* \*